Dec. 12, 1950     R. B. DE LANO, JR., ET AL     2,534,006
SUPERSONIC INSPECTION DEVICE
Filed June 1, 1946     2 Sheets-Sheet 1
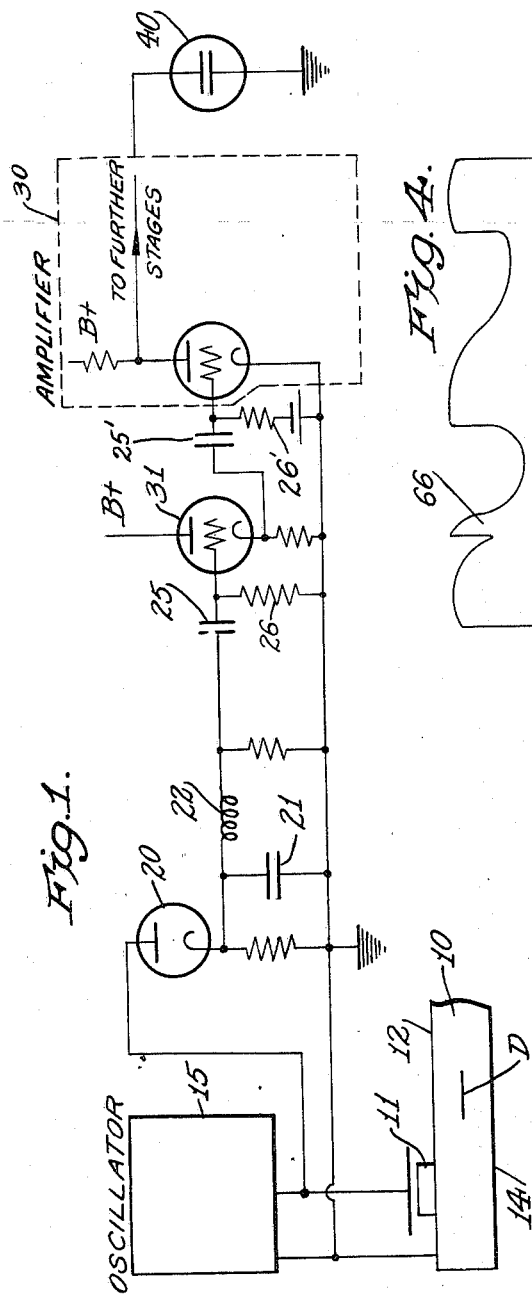
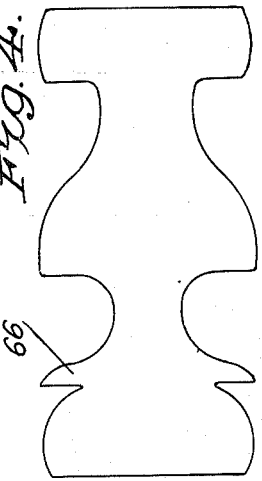
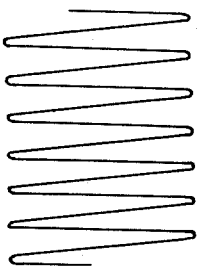
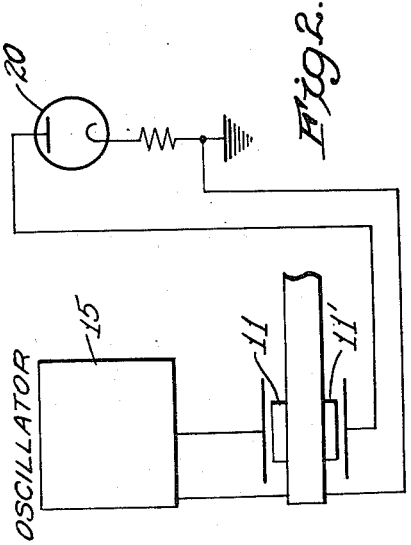
INVENTORS
RALPH B. DE LANO JR.
EVERARD M. WILLIAMS
BY
Joseph H. Lipschutz
ATTORNEY

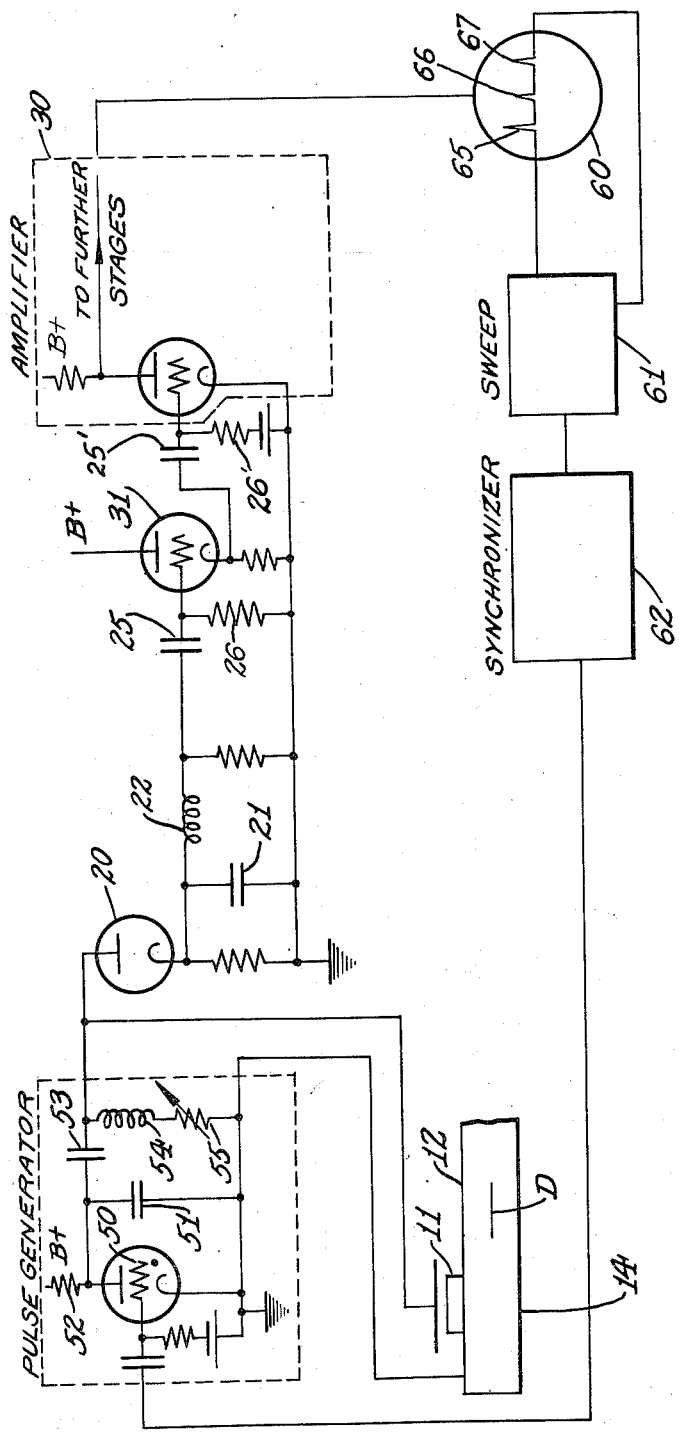

Patented Dec. 12, 1950

2,534,006

UNITED STATES PATENT OFFICE 2,534,006

SUPERSONIC INSPECTION DEVICE

Ralph B. De Lano, Jr., New York, N. Y., and Everard M. Williams, Pittsburgh, Pa., assignors to Sperry Products, Inc., Hoboken, N. J., a corporation of New York Application June 1, 1946, Serial No. 673,730

2 Claims. (Cl. 73—67)

1

This invention relates to a method and means for supersonic inspection of objects. In general, two such methods are now known. One of these consists in transmitting pulses into the object at spaced intervals and indicating the time interval between the transmission of the pulse and the reception of its reflection from a reflecting surface which may be a defect within the object or it may be the opposite surface of the object under test. Such a system is disclosed in the patent to Floyd A. Firestone, No. 2,280,226, patented April 21, 1942. Another known method of supersonic inspection consists in transmitting a continuous wave into the material and measuring the quantity of energy passing through the material, on the theory that a defect within the object will vary the amount of energy which passes through the object. In another form, the continuous wave type of supersonic inspection relies on detecting a variation in the amount of energy which is received from a reflecting surface.

It is one of the principal objects of this invention to provide still another means for supersonic inspection in which the rate of change of energy reception by an electro-mechanical transducer is utilized for the purpose of indicating the presence of defects. This means is particularly adapted to the testing of rapidly moving objects and is adapted for use with continuous transmission of energy into the object either at a constant level or in the form of pulsations.

Further objects and advantages of this invention will become apparent in the following detailed description thereof.

In the accompanying drawings:

Fig. 1 is a wiring diagram illustrating one embodiment of the principles of this invention.

Fig. 2 is a modified form of the Fig. 1 embodiment.

Fig. 3 is a wiring diagram illustrating the principles of this invention utilizing a pulsating form of energization.

Fig. 4 is a graph of the envelope of the energization employed with the Fig. 3 form of the invention.

Fig. 5 is a graph of the type of energization employed in the Figs. 1 and 2 forms of the invention.

Referring first to the embodiment of the invention disclosed in Fig. 1, it will be seen that an object under test, which may be a plate or sheet of material 10, is adapted to be moved past a testing station or position, at which position contact is made with one surface 12 of the object 10 by an electro-acoustic transducer 11 which may be a piezo-electric element such as a quartz crystal. Said element may be energized from a source of continuous oscillation 15 which produces a wave form of substantially constant amplitude as shown in Fig. 5. The oscillations from oscillator 15 are transmitted through the object 10 by the crystal 11 and normally these oscillations will be received by the crystal 11 after being reflected from any reflecting surfaces within the object 10. Such reflecting surface may be an internal defect D or it may be the surface 14 of the object 10 opposite the surface 12 through which the oscillations enter. In the form of invention shown in Fig. 1 a single crystal 11 is utilized for both transmission and reception but, as will be described hereinafter, separate crystals may be employed for transmission and reception as shown in Fig. 2.

When a single crystal 11 is utilized for transmitting and receiving, the voltage on crystal 11 will be a composite of the voltages impressed thereon by oscillator 15 and the voltages induced by the mechanical vibrations which are received by the crystal 11 in reflection from the reflecting surfaces of object 10. This composite voltage will normally have a substantially constant range when no internal defect is present, but when a defect such as D is encountered there will be a sudden high rate of variation of the normal output of crystal 11, and this high rate of variation is utilized for the purpose of actuating a suitable indicator.

The means whereby the high rate of variation of output of crystal 11 in response to an internal defect within the object 10 actuates a suitable indicator comprises a rectifying tube 20 across which the output from the crystal 11 is placed and the rectified output is integrated by a filter including condenser 21 and inductance 22 so that an output will be obtained in the form of a voltage envelope which has a periodic variation which is slow relative to the testing frequency. This output is passed through a series of rate differentiators 25, 26 and 25', 26'. Each rate differentiator comprising a condenser and a resistance will attenuate the output from the filter 21, 22 and will not pass relatively slow rates of change of the voltage envelope. Rate differentiator 25, 26 is connected to rate differentiator 25', 26' through a cathode follower circuit including tube 31. This means that the fairly steady output from the crystal 11 and, therefore, rectifier 20 and filter 21, 22 will not pass the rate differentiators. When, however, the testing crystal 11 encounters a defect such as D, the output from the crystal is suddenly and rapidly changed to give a sharp rate of change in the voltage envelope output from rectifier 20 and filter 21, 22. The object 10 must be moved relative to the crystal at such rate that a defect will yield the necessary rate of change in the voltage envelope sufficient to pass through the rate differentiators. This rapid rate of change will be passed through the rate differentiators which, after being amplified in amplifier 30, is caused to actuate any suitable indicator, such as neon tube 40. As many rate differentiators and amplifier tubes may be employed as desired to produce the necessary sharp output in response to the variation caused by the defect D sufficient to actuate the indicator.

By rate differentiating before amplifying, it is possible to utilize high voltage pulses without overloading and rendering the amplifier insensitive. It makes possible also the reception of reflections from reflecting surfaces before the termination of the pulse.

Instead of a constant amplitude oscillator as the energizing source, as shown in Fig. 1, there may be employed an undulating or pulsating type of oscillation. With this type of oscillation it is not essential that the object be moved relative to the crystal since the relative movement is obtained through the changing excitation. The latter oscillation may be continuous in that there are no gaps or periods of no excitation of the crystal 11 or it may be in the form of separated pulses. For this purpose, as shown in Fig. 3, there may be employed a gaseous discharge tube 50 designed to discharge periodically to permit discharge of a condenser 51 which normally charges through a suitable source 52. The said condenser 51 discharges through a circuit including the capacity 53 and inductance 54 which may be in series with a variable resistor 55 whose setting determines the pulse length. The damping characteristic of oscillatory circuit 53, 54, 55 may be such that the pulse duration exceeds the time interval between successive discharges of tube 50 whereby the undulating or pulsating output is obtained as shown in Fig. 4. Said pulsating source of energy is placed upon the crystal 11 which, therefore, permits a correspondingly pulsating energization into the object 10 as it moves past the crystal 11 at the testing station. The output from the crystal 11, which is a composite of the energizing voltage placed thereon, plus the voltage induced by the reflected waves is passed through the rectifier 20 and filter 21, 22 to yield an output in the form of a voltage envelope having a relatively slow rate of change. The amplitude of this envelope output varies from the sharp initial pulse at the beginning to the relatively small amplitude toward the end of the pulse. The sharp initial front of each pulse will be passed by the rate differentiators although the rest of the pulse is of too slow a rate of change to be passed. Thus, only the beginning of each pulse will come through the amplifier to actuate the indicator and it is necessary to provide a type of indicator wherein distinction can be made between the sharp initial front of each pulse and the high rate of change which is induced when the crystal 11 encounters a defect D. Since an indicator such as neon tube 40 would be actuated by the sharp front of each pulse and since these pulses occur rapidly, an indicator such as 40 would be continuously actuated and it would not be possible to differentiate between these actuations due to the front faces of the pulses and the actuations due to a defect.

Therefore, there is employed a different type of indicator which is preferably a cathode ray tube 60 having a horizontal sweep produced by sweep circuit 61. A synchronizer 62 which is energized periodically from a suitable source operates the sweep and trips the tube 50 so that the pulses generated by the tube are synchronized with the sweep of the cathode ray tube. The front face of each undulation will be passed by the rate differentiators and the amplifier 30 and will be placed upon the vertical plates of the cathode ray tube 60 to produce a sharp variation in the horizontal sweep, but since these undulations are synchronized with the sweep, the indications due to the front faces of the undulations will overlap and will always occur in the same position so that only a single indication will be produced on the cathode ray tube in response to the generated undulations. A high rate of change due to a defect will come through later than the front face of the first pulse and, therefore, will produce an indication on the cathode ray tube spaced from the indication due to the front faces of the pulses. Thus, the latter may produce the indication 65 while the defect will produce the spaced indication 66. The reflection of the front face of the pulse from the surface 14 will produce an indication 67.

Instead of utilizing the single crystal 11 for both transmission and reception, separate crystals 11 and 11' may be utilized for transmission and reception, respectively, as shown in Fig. 2. The crystal 11' for receiving the reflected waves may be positioned on the same side of the object with the transmitting crystal 11 or it may be placed on the opposite surface 14 so as to respond to the waves transmitted through the object. In this case, the crystal 11' will not have the voltage of the oscillator placed thereon so that the output of crystal 11' will be a function only of the waves received thereby. This output is placed upon the rectifier 20 and this form of invention operates thereafter in the same manner as described in connection with Fig. 1.

The foregoing description of the invention is merely illustrative and changes may be made within the scope of the appended claims.

Having described the invention, what is claimed is:

1. In a supersonic device for inspecting objects, means for generating supersonic waves, means for transmitting the waves into the object and for receiving the waves coming out of the object, means for detecting the voltage envelope of the received waves coming out of the object, a rate differentiator for said voltage envelope adapted to differentiate between normal rate of change of the voltage envelope when no defect is present in the object and the rate of change of the voltage envelope when a defect is present, an amplifier for amplifying the output of the rate differentiator, an indicator, and means whereby the output of said amplifier actuates said indicator.

2. In a supersonic device for inspecting objects, means for generating supersonic waves, means for transmitting the waves into the object and for receiving the waves coming out of the object, means for detecting the voltage envelope of the received waves coming out of the object, a rate differentiator for said voltage envelope adapted to differentiate between relatively slow changes in the normal voltage envelope when no defect is present in the object and relatively high rate of change in the voltage envelope when a defect is present so as to pass only the relatively high rate of change, an amplifier for amplifying the output of the rate differentiator, an indicator, and means whereby the output of said amplifier actuates said indicator.

RALPH B. DE LANO, JR.
EVERARD M. WILLIAMS.

REFERENCES CITED

The following references are of record in the file of this patent:

UNITED STATES PATENTS

| Number | Name | Date |
| --- | --- | --- |
| 2,113,376 | Janco | Apr. 5, 1938 |
| 2,275,675 | Draper et al. | Mar. 10, 1942 |
| 2,280,226 | Firestone | Apr. 21, 1942 |